(12) United States Patent
Hart et al.

(10) Patent No.: US 8,423,734 B2
(45) Date of Patent: *Apr. 16, 2013

(54) MAKING AUTOMATED USE OF DATA VOLUME COPY SERVICE TARGETS

(75) Inventors: Brian Hart, Austin, TX (US); Anil Kalavakolanu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 350 days.

This patent is subject to a terminal disclaimer.

(21) Appl. No.: 12/766,147

(22) Filed: Apr. 23, 2010

(65) Prior Publication Data

US 2011/0264879 A1 Oct. 27, 2011

(51) Int. Cl.
*G06F 12/00* (2006.01)

(52) U.S. Cl.
USPC ............... 711/162; 711/161; 711/E12.001; 711/E12.103

(58) Field of Classification Search .............. 711/161, 711/162, E12.001, E12.103
See application file for complete search history.

(56) References Cited

U.S. PATENT DOCUMENTS

| | | | |
|---|---|---|---|
| 5,915,264 A | 6/1999 | White et al. | |
| 6,052,797 A | 4/2000 | Ofek et al. | |
| 6,502,205 B1 | 12/2002 | Yanai et al. | |
| 7,444,420 B1 | 10/2008 | Mutalik et al. | |
| 7,870,094 B2 * | 1/2011 | Tsuge et al. | 707/611 |
| 8,098,824 B2 * | 1/2012 | Mikami et al. | 380/277 |
| 2008/0313399 A1 * | 12/2008 | Kezuka et al. | 711/114 |
| 2009/0060195 A1 * | 3/2009 | Mikami et al. | 380/277 |
| 2009/0327631 A1 * | 12/2009 | Yamada et al. | 711/162 |
| 2012/0198190 A1 | 8/2012 | Hart et al. | |

OTHER PUBLICATIONS

Hart et al., U.S. Appl. No. 13/442,538, filed Apr. 9, 2012, 38 pages.
Office Action, Jun. 22, 2012, U.S. Appl. No. 13/442,538, 12 pages.

\* cited by examiner

*Primary Examiner* — Charles Rones
*Assistant Examiner* — Mehdi Namazi
(74) *Attorney, Agent, or Firm* — Yee & Associates, P.C.; Libby Z. Toub (57) ABSTRACT

A system and computer program product for automatically managing copies of source data volumes are provided. A copy management agent receives a message that target volume copies of source volumes are available. The copy management agent accesses the target volume copies of the source volumes. The copy management agent analyzes metadata for the target volume copies. The copy management agent determines whether any of the target volume copies is a boot volume copy based on the analyzed metadata. In response to a determination that one of the target volume copies is a boot volume copy, the copy management agent directs a provisioning agent to provision a new host for the target volume copies. The copy management agent directs the storage subsystem to present the target volume copies to a storage area network port associated with the new host. Then, the new host is booted using the boot volume copy.

10 Claims, 8 Drawing Sheets

MAKING AUTOMATED USE OF DATA VOLUME COPY SERVICE TARGETS

This application is related to U.S. application Ser. No. 13/442,538 entitled "MAKING AUTOMATED USE OF DATA VOLUME COPY SERVICE TARGETS," filed Apr. 9, 2012, status pending.

BACKGROUND

1. Field

The disclosure relates generally to a data processing system and computer program product for automatically managing data volume copies.

2. Description of the Related Art

In modern computer systems today, collections of data are usually organized and stored in one or more volumes. A volume is an area of storage for data. A volume may be located in a file system. Volumes are typically stored on one or more storage subsystems. A storage subsystem provides persistent storage of data and typically includes one or more storage devices, such as disk drives. The data stored within the volumes have associated metadata to describe the data and allow access to the data.

Modern storage subsystems provide a variety of functions. For example, a storage subsystem may provide a copy service function, which allows almost instantaneous point-in-time copies of storage volumes to be made from a source location to a target location independent of a host machine. Users often utilize this copy service function to create data backups of storage volumes for reporting purposes, disaster recovery, and the like.

Once copies of the storage volumes are created, the storage volume copies may be attached to a host machine for accessing the copied data. However, the user then performs actions to provision the host system for the new storage volume copies. In addition, the user performs additional actions to attach the new storage volume copies to that host machine.

SUMMARY

According to different embodiments of the present invention, a data processing system and a computer program product for automatically managing copies of source data volumes are provided. A copy management agent receives a message from a storage subsystem. The message indicates that target volume copies of source volumes are available for access. The copy management agent accesses the target volume copies of the source volumes. The copy management agent analyzes metadata for the target volume copies. The copy management agent determines whether any of the target volume copies is a boot volume copy based on the analyzed metadata for the target volume copies. In response to a determination that one of the target volume copies is a boot volume copy, the copy management agent directs a provisioning agent to provision a new host for the target volume copies. The copy management agent directs the storage subsystem to present the target volume copies to a storage area network port associated with the new host. Then, the copy management agent directs the provisioning agent to boot the new host using the boot volume copy. In response to a determination that none of the target volume copies is a boot volume copy, the copy management agent directs the storage subsystem to present the target volume copies to a storage area network port associated with an existing host specified in a configuration database associated with the copy management agent.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Illustrative embodiments provide a data processing system and a computer program product for automatically managing copies of source data volumes. Illustrative embodiments utilize a copy management agent running on a suitable platform, such as a hardware management console, which is notified by a storage subsystem when a copy service function, such as FlashCopy®, completes a target volume copy of a source data volume. It should be noted that the copy management agent may alternatively be executing on a virtual input/output server. A virtual input/output server is a software application that is located in a logical partition. This software application facilitates the sharing of physical input/output resources between client logical partitions in the virtual server.

The storage subsystem informs the copy management agent of the particulars, such as locations, of the newly generated target volume copies and makes the content of the target volume copies accessible to the copy management agent. After receiving the notification from the storage subsystem that a target volume copy of a source data volume is accessible, the copy management agent then inspects metadata associated with the target volume copy and takes an appropriate action. One action may be to automatically assign the target volume copy of a source volume to an existing host device. For example, if the metadata indicates that the target volume copy is a member of a non-boot volume group, the copy management agent will take the actions necessary to automatically present the target volume copy to an existing host device.

Another action may be to provision a new host device and then assign the new target volume copy of a source volume to the newly provisioned host device. For example, if the metadata indicates that the target volume copy is a member of a boot volume group, such as, for example, an Advanced Interactive Executive (AIX®) host root volume group, the copy management agent will provision a new host device. The new host device may, for example, be an existing physical device from a pool of physical devices or may be a newly generated virtual machine, logical partition, or virtual input/output client logical partition on a virtual input/output server.

After provisioning the new host device, the copy management agent will then take actions to present the target volume copy to the newly provisioned host device. Actions may, for example, include modifying the target volume copy presentation in the storage subsystem or modifying a virtual device mapping in a virtual input/output server or in a virtual device's hosting partition. The newly provisioned host device is then booted from the new boot volume copy.

The copy management agent also may alter the content, such as volume identifiers and metadata, contained in the target volume copies when appropriate during pre-boot customization. For example, if the metadata associated with the target volume copies includes volume identifiers, the copy management agent may update the volume identifiers before performing the presentation of the target volume copies to the host device. One possible rationale for updating the volume identifiers is to avoid a problem of duplicate volume identifiers in the volume copy management system as a whole because during the volume copying process the volume identifiers are also copied. System administrators may find it confusing if multiple copies of volumes exist with the same volume identifiers in the system. Thus, updating the volume identifiers will help ensure, for example, that target volume copies can be easily distinguished from the source volumes.

Another example of altering the content contained in the target volume copies during pre-boot customization is when the copy management agent determines that a target volume copy contains a boot volume. In response to determining that the target volume copy contains a boot volume, the copy management agent may update the content of the boot partition to reflect a new hostname and/or new IP address for the new host system before provisioning the new host system.

In addition, the copy management agent may perform further actions on the host device that the target volume copies are assigned to. For example, if the metadata stores information about an owning host device for a target volume copy, then the copy management agent may assign target volume copies from related volume groups as a group to a single, perhaps newly provisioned, host device. In addition, the copy management agent may perform scripted post-boot customization activities, such as setting up new IP addresses for new host devices, starting a data instance of a new target volume copy, and other suitable activities. These scripts may be native to the copy management agent or may be downloaded to the copy management agent from a customer client device. Further, the copy management agent may be changed by a customer/user to specify parameters, such as memory size and/or central processing unit (CPU) size, for newly provisioned host devices, mappings of specific volume groups to existing host devices, etc.

Moreover, the storage subsystem is configured with the location, such as a network address, of the copy management agent. Likewise, the copy management agent is configured with information necessary for the copy management agent to access the storage subsystem via a communications network, as well as access the storage subsystem directly via, for example, a Fibre Channel Storage Area Network (SAN). In addition, the copy management agent may be configured with the location or network address of a provisioning agent.

Figure 1:
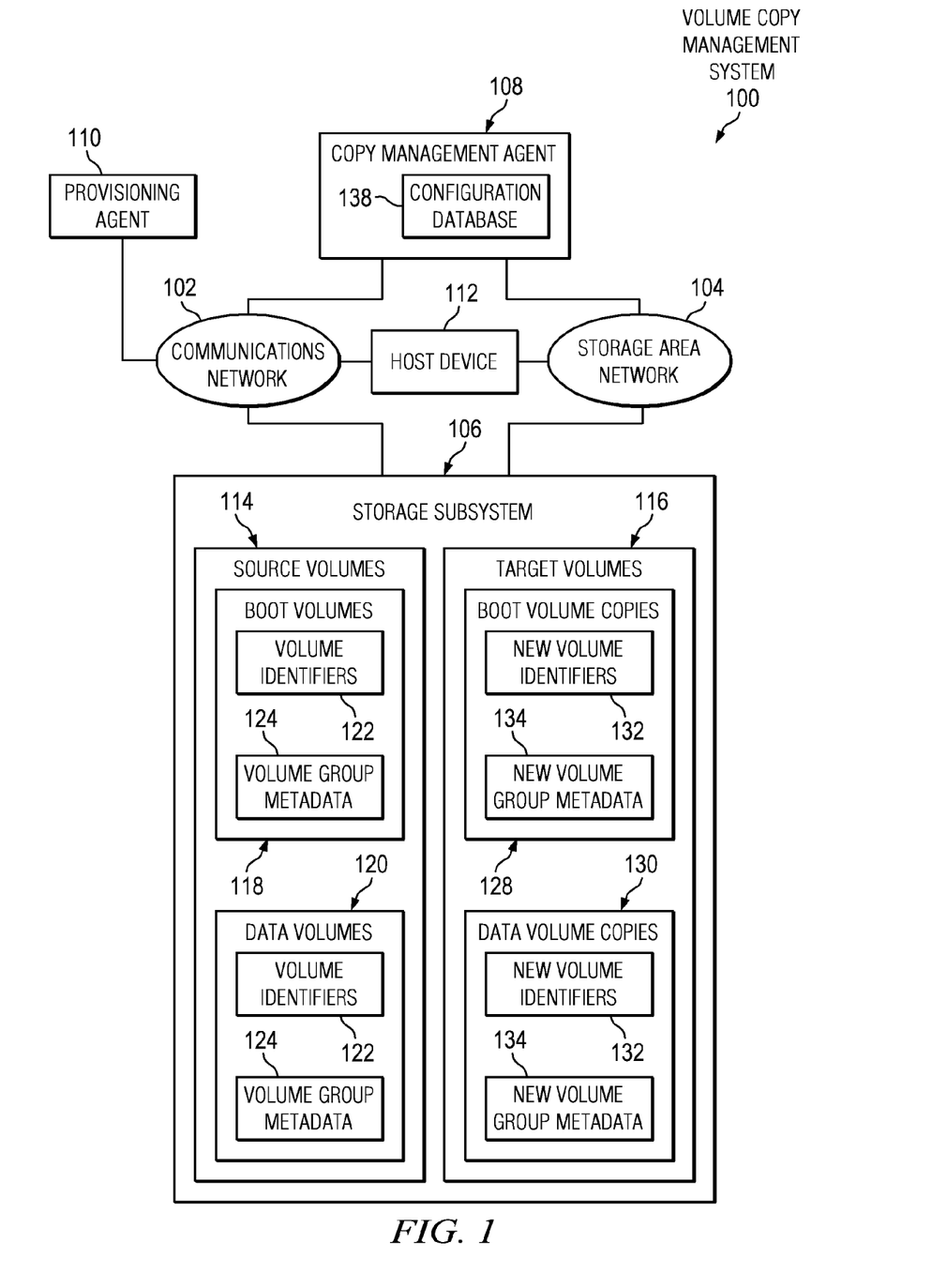
FIG. 1 is a pictorial representation of a network of data processing systems in which illustrative embodiments may be implemented.
Figure 2:
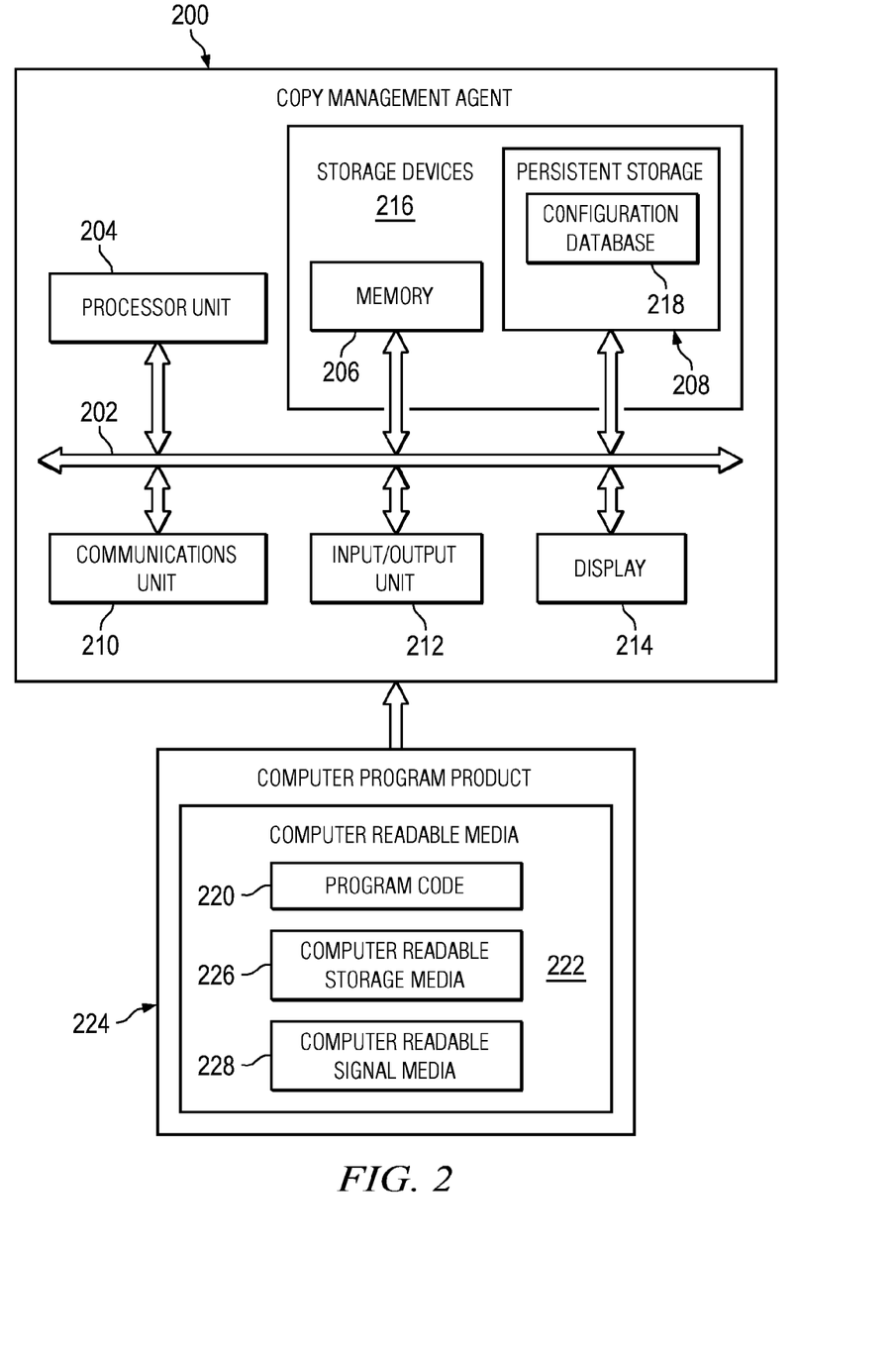
FIG. 2 is a diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Volume copy management system 100 is a network of computers and other devices in which illustrative embodiments may be implemented. Volume copy management system 100 includes communications network 102, storage area network 104, storage subsystem 106, copy management agent 108, provisioning agent 110, and host device 112.

Communications network 102 is a medium used to provide communications links between the computers and other various devices connected together within volume copy management system 100. Communications network 102 is a general purpose network, such as, for example, an Ethernet-based Transmission Control Protocol/Internet Protocol (TCP/IP) network, for carrying messages between host device 112 and storage subsystem 106, copy management agent 108, and provisioning agent 110. Of course, communications network 102 may be implemented as a number of different types of networks, such as, for example, an intranet, a local area network (LAN), or a wide area network (WAN). Also, communications network 102 may include connections, such as wire, wireless communication links, or fiber optic cables.

Storage area network 104 is a network, such as, for example, a Fiber Channel Storage Area Network (SAN), for carrying data traffic from host device 112 to data storage volumes in storage subsystem 106. Storage subsystem 106 is a set of one or more devices, such as disk drives, which persistently store data. In this illustrative example, storage subsystem 106 stores the data in volumes, such as source volumes 114 and target volumes 116. It should be noted that even though source volumes 114 and target volumes 116 are shown to be stored in one storage subsystem, source volumes 114 and target volumes 116 may be stored in separate storage subsystems.

A volume is a unit of data storage, which typically appears as a disk drive to a host system, such as host device 112. Host device 112 can read and write data from a storage volume. Source volumes 114 are data volumes that storage subsystem 106 may use to generate copies of the data contained in the volumes for data backup or reporting purposes. Target volumes 116 are target volume copies of source data volumes, such as source volumes 114. A copy service function within storage subsystem 106 copies the data contents of one volume, the source volume, to another volume, the target volume copy. It should be noted that the copy service function may copy the data contents of a source volume within one storage subsystem to a target volume copy within another storage subsystem. In other words, illustrative embodiments do not restrict the data copying process to be performed only within one storage subsystem.

Source volumes 114 include boot volumes 118 and data volumes 120. A boot volume is a data storage volume that is used to boot a host system, such as host device 112. The boot volume includes an operating system image for the host system. A data volume is a volume that is used as a data repository by the host system. In other words, a data volume is a data storage area with a file system. The data storage area may be located in one or more storage devices. The data on the data volume may, for example, be a formal database, such as DB2® or Oracle® database, or a file system storage.

Boot volumes 118 and data volumes 120 both include volume identifiers 122 and volume group metadata 124. A volume identifier is an identifier defined by a host system, such as host device 112, which is stored on a volume to allow a host system to recognize or identify that particular data volume. It should be noted that this volume identifier is different and distinct from a port identifier and a unit identifier that is used to locate a data volume on a storage area network, such as storage area network 104. Volume group metadata is metadata stored on a data volume to allow a host system to identify, via volume identifiers, which storage volumes are included in a volume group and the relationship between the data storage volumes in the volume group.

A volume group is a set of two or more data storage volumes, which a host system uses a unit. A set of data volumes may be used as a volume group when, for example, data for a particular application or purpose requires more storage space than is available on a single volume. A portion or segment of the space on each of the data volumes in the volume group is occupied by volume group metadata 124.

Target volumes 116 include boot volume copies 128 and data volume copies 130. A boot volume copy is a copy of a data volume that includes an operating system image and is used to boot a new host system. A new host system is a physical or virtual host system that is newly provisioned to use the newly generated target volume copies, which include a boot volume copy. A data volume copy is a copy of the data contained in a storage volume.

Boot volume copies 128 and data volume copies 130 both include new volume identifiers 132 and new volume group metadata 134. A new volume identifier is a newly generated identifier that is stored on a newly generated target volume to allow a host system to identify that particular target volume copy of a source volume. It should be noted that this new volume identifier for the target volume is different and distinct from the volume identifier of the copied source volume. New volume group metadata is metadata stored on target volume copies that is updated to include the new volume identifiers for the target volume copies included in a volume group. It should be noted that the copy service function of storage subsystem 106 leaves the volume identifiers and the volume group metadata the same on both the source and target volumes during the data copying process. In other words, the copy service function does not update the volume identifiers and the volume group metadata on the volumes. Copy management agent 108 updates target volumes 116 after the copying process to provide target volumes 116 with new volume identifiers and volume group metadata.

Host device 112 is an example of a computer system that makes use of the data volumes in storage subsystem 106. Host device 112 represents a plurality of physical and/or virtual host systems in volume copy management system 100. Host device 112 and storage subsystem 106 are coupled to storage area network 104. Host device 112 may use volumes as boot volumes or data volumes and may group the volumes into volume groups.

Copy management agent 108 is an example of a computer system comprising hardware and software components. However, it should be noted that copy management agent 108 may be comprised entirely of one or more software components. Copy management agent 108 manages the process of generating new volume identifiers and new volume group metadata for newly generated target volume copies of source volumes. In addition, copy management agent 108 assigns target volume copies to existing host systems. Copy management agent 108 is coupled to storage subsystem 106 via communications network 102 and storage area network 104. However, it should be noted that even though copy management agent 108 is shown as a separate component in volume copy management system 100, copy management agent 108 may, for example, be included in storage subsystem 106.

Copy management agent 108 includes configuration database 138. Configuration database 138 stores data within copy management agent 108. The data stored in configuration database 138 may, for example, be site-specific information regarding desired destinations for target volume copies of source data volumes or volume group copies. In addition, the data may include information regarding the use of those target volume copies.

Provisioning agent 110 is an example of a computer system comprising hardware and software components. However, it should be noted that provisioning agent 110 may be comprised entirely of one or more software components. Provisioning agent 110 is a component capable of bringing a new host system online. Bringing a new host system online may include generating a new virtual machine or selecting an idle physical machine from a pool of idle physical machines. Then, provisioning agent 110 configures the new machine to use a specific target volume copy as the new machine's boot volume. Afterward, provisioning agent 110 starts the new machine, which boots from the specified boot volume copy, to become a host system for target volume copies.

Storage subsystem 106 provides persistent storage of data and includes one or more storage devices, such as disk drives, for storing the data and a controller component for controlling functions of storage subsystem 106. Storage subsystem 106 presents volumes to the host systems and to the copy management and provisioning agents. Volumes presented by storage subsystem 106 to the host systems and to the copy management agent via storage area network 104 include a location, such as a port identifier and a unit identifier, which may be visible to some host systems and not to others. Host systems often store a volume identifier at a location defined by the host systems on the storage volume.

It should be noted that FIG. 1 is only intended as an example, and not as an architectural limitation for the different illustrative embodiments. For example, volume copy management system 100 may include servers, clients, and other devices not shown. Program code located in copy management system 100 may be stored on a computer recordable storage medium and downloaded to a data processing system or other device for use. For example, program code may be stored on a computer recordable storage medium on a server and downloaded to copy management agent 108 over communications network 102 for use on copy management agent 108.

With reference now to FIG. 2, a diagram of a data processing system is depicted in accordance with an illustrative embodiment. Copy management agent 200 is an example of a computer, such as a hardware management console, in which computer usable program code or instructions implementing processes of illustrative embodiments may be located. Copy management agent 200 may, for example, be copy management agent 108 in FIG. 1. In this illustrative example, copy management agent 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a transient basis and/or a persistent basis. Memory 206, in these examples, may, for example, be a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Persistent storage 208 includes configuration database 218. Configuration database 218 may, for example, be configuration database 138 in FIG. 1. Configuration database 218 may be a structured database, such as a relational database, or an unstructured database, such as an object-oriented database, for storing data. The stored data may, for example, include data relating to locations of source data volumes, such as source volumes 114 in FIG. 1, within a storage subsystem, such as storage subsystem 106 in FIG. 1, and desired destinations of target data volume copies of the source data volumes, such as target volumes 116 in FIG. 1, within the storage subsystem for use by host devices, such as host device 112 in FIG. 1. In addition, the stored data may include information regarding the use of the target volume copies of the source volumes.

Communications unit 210, in these examples, provides for communication with other data processing systems or devices, such as the storage subsystem, host devices, and provisioning agent. The provisioning agent may, for example, be provisioning agent 110 in FIG. 1. In these examples, communications unit 210 is a network interface card and/or a modem. Communications unit 210 may provide communications through the use of either or both physical and wireless communications links.

Input/output unit 212 allows for the input and output of data with other devices that may be connected to copy management agent 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for an operating system, applications, and/or programs may be located on storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code, in the different embodiments, may be embodied on different physical or computer readable storage media, such as memory 206 or persistent storage 208.

Program code 220 is located in a functional form on computer readable media 222 that is selectively removable and may be loaded onto or transferred to copy management agent 200 for running by processor unit 204. Program code 220 and computer readable media 222 form computer program product 224. In one example, computer readable media 222 may be computer readable storage media 226 or computer readable signal media 228. Computer readable storage media 226 may, for example, include an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to copy management agent 200. In some instances, computer readable storage media 226 may not be removable from copy management agent 200.

Alternatively, program code 220 may be transferred to copy management agent 200 using computer readable signal media 228. Computer readable signal media 228 may, for example, be a propagated data signal containing program code 220. For example, computer readable signal media 228 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 220 may be downloaded over a network to persistent storage 208 from another device or data processing system through computer readable signal media 228 for use within copy management agent 200. For instance, program code stored in a computer readable storage media in a server data processing system may be downloaded over a network from the server to copy management agent 200. The data processing system providing program code 220 may be a server computer, a client computer, or some other device capable of storing and transmitting program code 220.

The different components illustrated for copy management agent 200 are not meant to provide architectural limitations to the manner in which different embodiments may be implemented. The different illustrative embodiments may be implemented in a data processing system including components in addition to or in place of those illustrated for copy management agent 200. Other components shown in FIG. 2 may be varied from the illustrative examples shown. The different embodiments may be implemented using any hardware device or system capable of executing program code. As one example, copy management agent 200 may include organic components integrated with inorganic components and/or may be comprised entirely of organic components excluding a human being. For example, a storage device may be comprised of an organic semiconductor.

As another example, a storage device in copy management agent 200 is any hardware apparatus that may store data. Memory 206, persistent storage 208, and computer readable media 222 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3A:
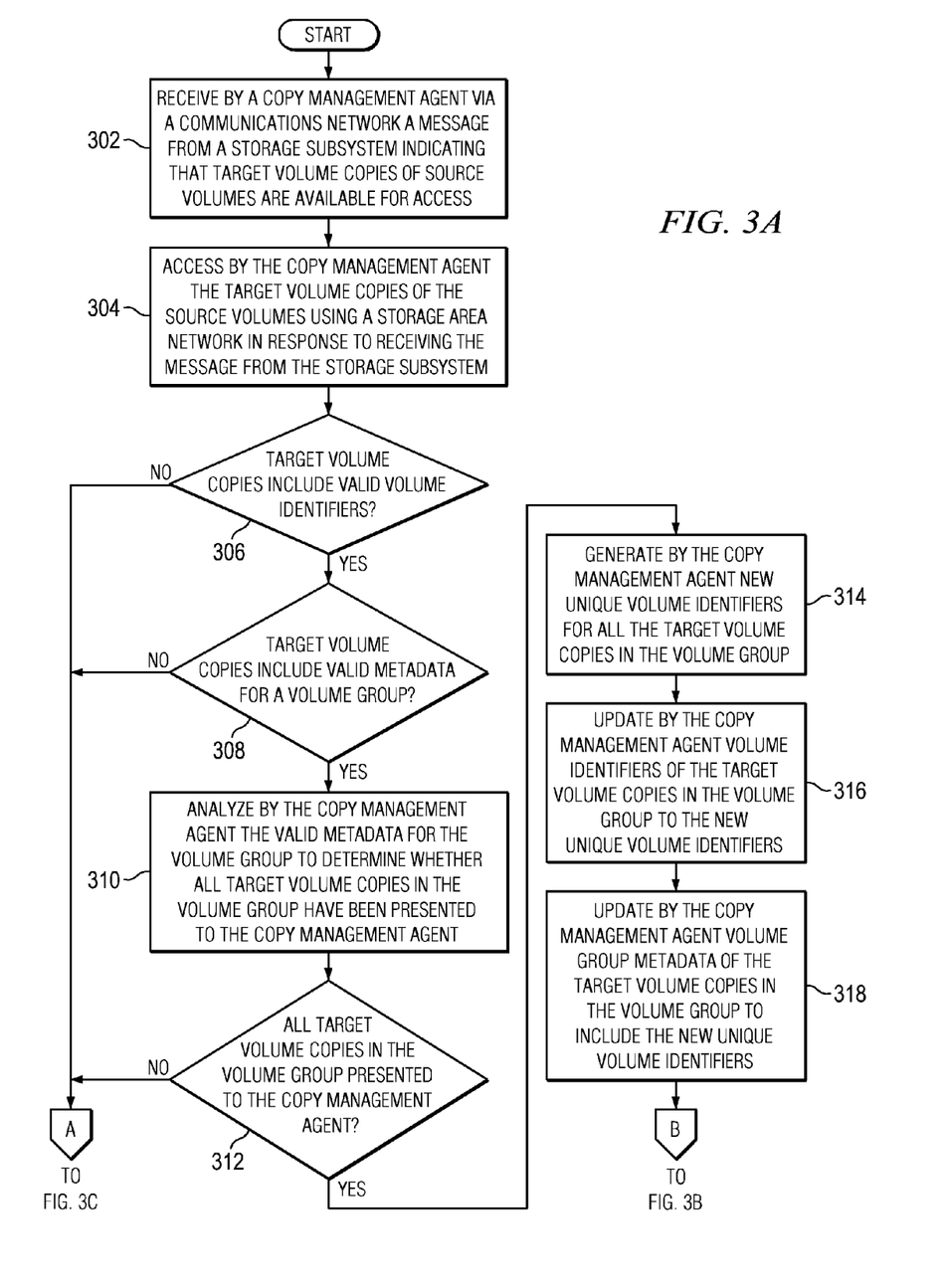
FIG. 3A, FIG. 3B and FIG. 3C is a flowchart illustrating a process for a copy management agent in accordance with an illustrative embodiment.
Figure 3B:
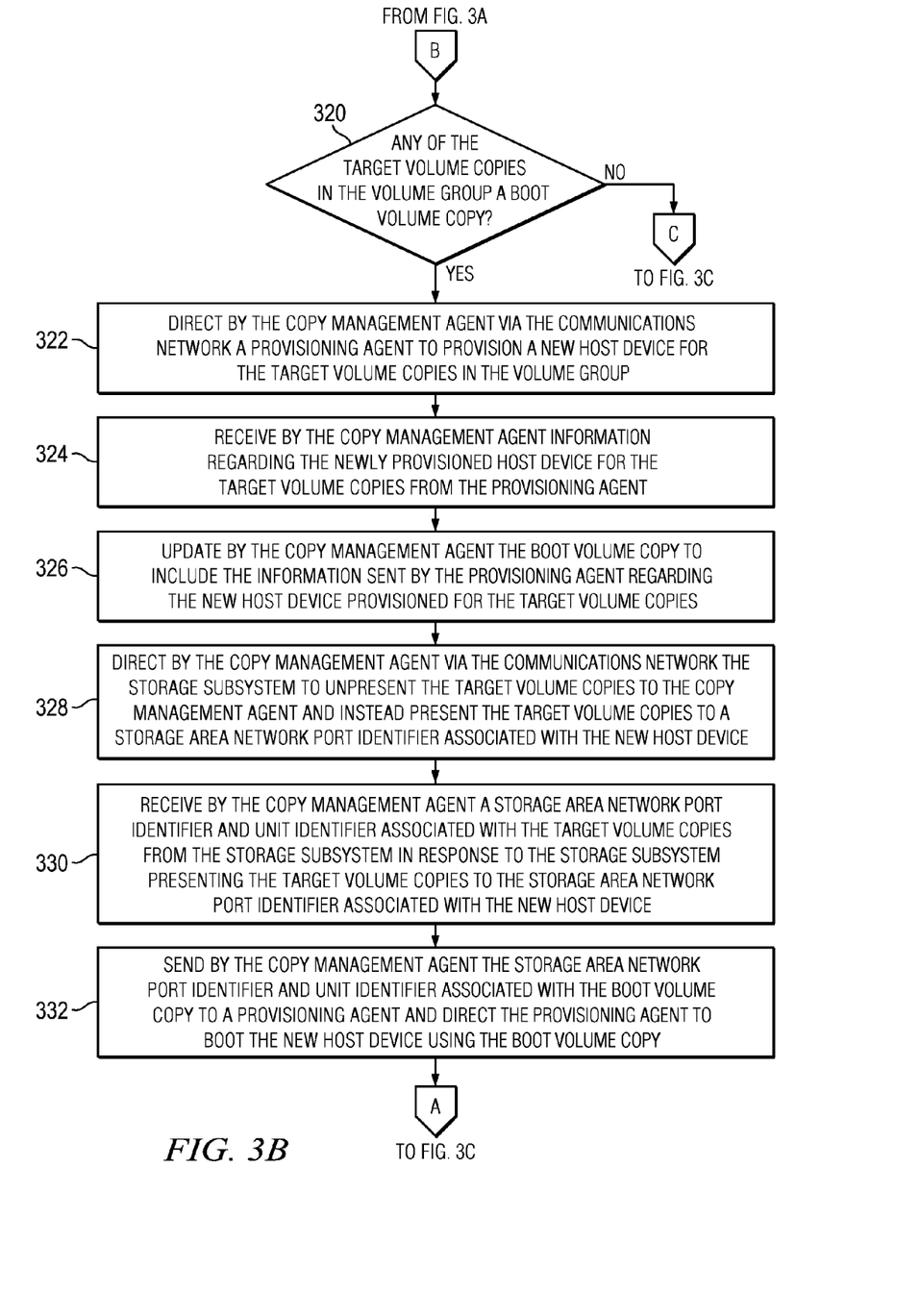
Figure 3C:
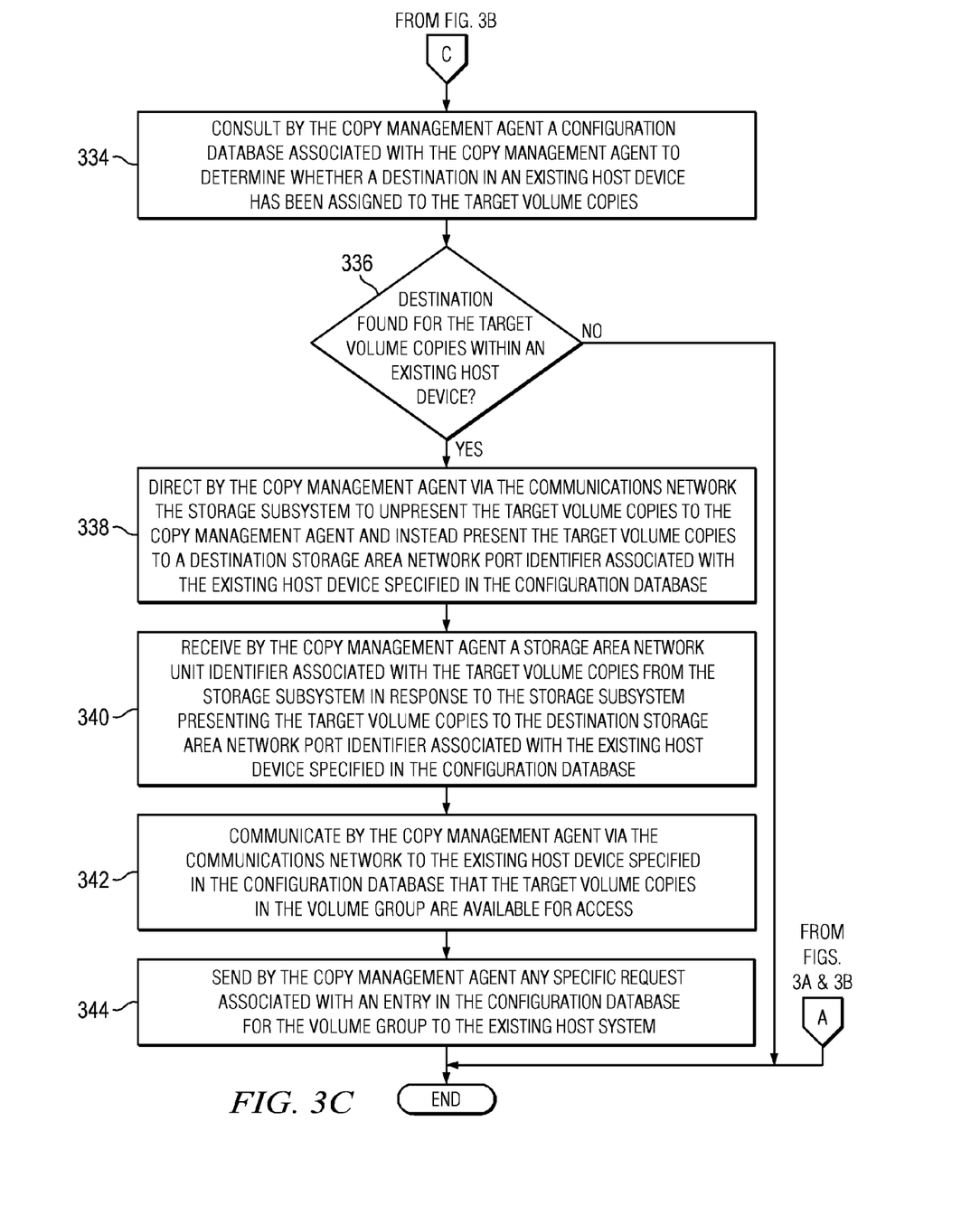

With reference now to FIG. 3A, FIG. 3B and FIG. 3C, a flowchart illustrating a process for a copy management agent is shown in accordance with an illustrative embodiment. The process shown in FIGS. 3A, 3B and 3C may be implemented in a copy management agent, such as copy management agent 108 in FIG. 1.

The process begins when the copy management agent receives via a communications network, such as communications network 102 in FIG. 1, a message from a storage subsystem, such as storage subsystem 106 in FIG. 1, indicating that target volume copies of source volumes, such as target volumes 116 in FIG. 1, are available for access (step 302). Then, the copy management agent accesses the target volume copies of the source volumes using a storage area network, such as storage area network 104 in FIG. 1, in response to receiving the message from the storage subsystem (step 304). It should be noted that the storage subsystem is aware of the storage area port identifier, such as a World Wide Port Name, of the copy management agent. In addition, the storage subsystem assigns unit identifiers to the target volume copies of the source volumes, which are presented to the copy management agent by the storage subsystem. The storage subsystem presents target volume copies to an entity, such as the copy management agent, by making the target volume copies visible to and accessible by the entity that the target volume copies are presented to. In other words, in this case the storage subsystem presents the target volume copies to the copy management agent, which are then accessible by the copy management agent.

Further, the storage subsystem prepares to accept Fibre Channel logins and subsequent input/output requests from the copy management agent. Furthermore, the storage subsystem sends via the communications network a message to the copy management agent indicating that the target volume copies have been presented and are available for access. Afterward, the copy management agent sends Fibre Channel logins to the storage subsystem to access the target volume copies and the storage subsystem accepts the Fibre Channel logins from the copy management agent based on the presentation of the target volume copies to the copy management agent.

Then, the copy management agent sends a request to the storage subsystem requesting a list of unit identifiers assigned to the target volume copies presented to the copy management agent by the storage subsystem. The storage subsystem responds by providing the list of unit identifiers assigned to the target volume copies presented to the copy management agent by the storage subsystem. Subsequently, the copy management agent accesses the presented target volume copies by sending input/output requests to the presented target volume copies in the storage subsystem, which are specified by the unit identifiers. Then, the storage subsystem processes the input/output requests made by the copy management agent.

After accessing the target volume copies in step 304, the copy management agent makes a determination as to whether the target volume copies include valid volume identifiers, such as volume identifiers 122 in FIG. 1 (step 306). If the copy management agent determines that the target volume copies do not include valid volume identifiers, no output of step 306, then the process terminates thereafter. If the copy management agent determines that the target volume copies do include valid volume identifiers, yes output of step 306, then the copy management agent makes a determination as to whether the target volume copies include valid metadata for a volume group, such as volume group metadata 124 in FIG. 1 (step 308).

If the copy management agent determines that the target volume copies do not include valid metadata for the volume group, no output of step 308, then the process terminates thereafter. If the copy management agent determines that the target volume copies do include valid metadata for the volume group, yes output of step 308, then the copy management agent analyzes the valid metadata for the volume group to determine whether all target volume copies in the volume group have been presented to the copy management agent (step 310). Subsequent to analyzing the valid metadata for the volume group in step 310, the copy management agent makes a determination as to whether all target volume copies in the volume group have been presented to the copy management agent (step 312).

If the copy management agent determines that not all target volume copies in the volume group have been presented to the copy management agent, no output of step 312, then the process terminates thereafter. If the copy management agent determines that all target volume copies in the volume group have been presented to the copy management agent, yes output of step 312, then the copy management agent generates new unique volume identifiers, such as new volume identifiers 132 in FIG. 1, for all the target volume copies in the volume group (step 314). Afterward, the copy management agent updates volume identifiers of the target volume copies in the volume group to the new unique volume identifiers (step 316).

Then, the copy management agent updates volume group metadata of the target volume copies in the volume group, such as new volume group metadata 134 in FIG. 1, to include the new unique volume identifiers (step 318). Subsequently, the copy management agent makes a determination as to whether any of the target volume copies in the volume group is a boot volume copy, such as one of boot volume copies 128 in FIG. 1 (step 320). If the copy management agent determines that a boot volume copy does exist within the target volume copies in the volume group, yes output of step 320, then the copy management agent directs via the communications network a provisioning agent, such as provisioning agent 110 in FIG. 1, to provision a new host device, such as host device 112 in FIG. 1, for the target volume copies in the volume group (step 322).

Subsequent to directing the provisioning agent to provision a new host device for the target volume copies in the volume group in step 322, the copy management agent receives information from the provisioning agent regarding the newly provisioned host device for the target volume copies in the volume group (step 324). After receiving the information regarding the newly provisioned host device in step 324, the copy management agent updates the boot volume copy to include the information sent by the provisioning agent regarding the new host device provisioned for the target volume copies (step 326). Then, the copy management agent contacts via the communications network the storage subsystem to direct the storage subsystem to un-present the target volume copies to the copy management agent and instead present the target volume copies to a storage area network port identifier associated with the new host device (step 328). Subsequently, the copy management agent receives a storage area network port identifier and unit identifier associated with the target volume copies from the storage subsystem in response to the storage subsystem presenting the target volume copies to the storage area network port identifier associated with the new host device (step 330).

Afterward, the copy management agent sends the storage area network port identifier and unit identifier associated with the boot volume copy to a provisioning agent, such as provisioning agent 110 in FIG. 1, and directs the provisioning agent to boot the new host device using the boot volume copy (step 332). It should be noted that the copy management agent may perform post-boot customization actions on the newly provisioned host device at this point. For example, the copy management agent may assign target volume copies from related volume groups to the newly provisioned host device as well. In addition, the copy management agent may generate a new IP address and host name for the newly provisioned host device or start a new formal database instance using the target volume copies. Further, the copy management agent may specify parameters, such as memory and CPU sizes, for the newly provisioned host device or map specific volume groups to existing host devices. Thereafter, the process terminates.

Returning again to step 320, if the copy management agent determines that a boot volume copy does not exist within the target volume copies in the volume group, no output of step 320, then the copy management agent consults a configuration database associated with the copy management agent, such as configuration database 138 in FIG. 1, to determine whether a destination in an existing host device has been assigned to the target volume copies (step 334). It should be noted that consultation of the configuration database by the copy management agent to determine whether a destination in an existing host device has been assigned to the target volume copies may be based on volume identifiers. If the consultation of the configuration database is based on volume identifiers, then the copy management agent may, for example, recall and utilize the original volume identifiers of the source volumes to determine destinations in existing host devices. After consulting the configuration database in step 334, the copy management agent makes a determination as to whether a destination was found for the target volume copies within an existing host device (step 336). If the copy management agent determines that a destination was not found in the configuration database for the target volume copies within an existing host device, no output of step 336, then the process terminates thereafter.

If the copy management agent determines that a destination was found in the configuration database for the target volume copies within an existing host device, yes output of step 336, then the copy management agent contacts via the communications network the storage subsystem to direct the storage subsystem to un-present the target volume copies to the copy management agent and instead present the target volume copies to a destination storage area network port identifier associated with the existing host device specified in the configuration database (step 338). Subsequently, the copy management agent receives a storage area network unit identifier associated with the target volume copies from the storage subsystem in response to the storage subsystem presenting the target volume copies to the destination storage area network port identifier associated with the existing host device specified in the configuration database (step 340).

Afterward, the copy management agent communicates via the communications network to the existing host device specified in the configuration database that the target volume copies in the volume group are available for access (step 342). Further, the copy management agent sends any specific request associated with an entry in the configuration database for the volume group to the existing host system for changing the existing host system (step 344). For example, a specific request may be to start a formal database instance, such as a DB2® or an Oracle® database instance, using the volume group. Thereafter, the process terminates.

Figure 4:
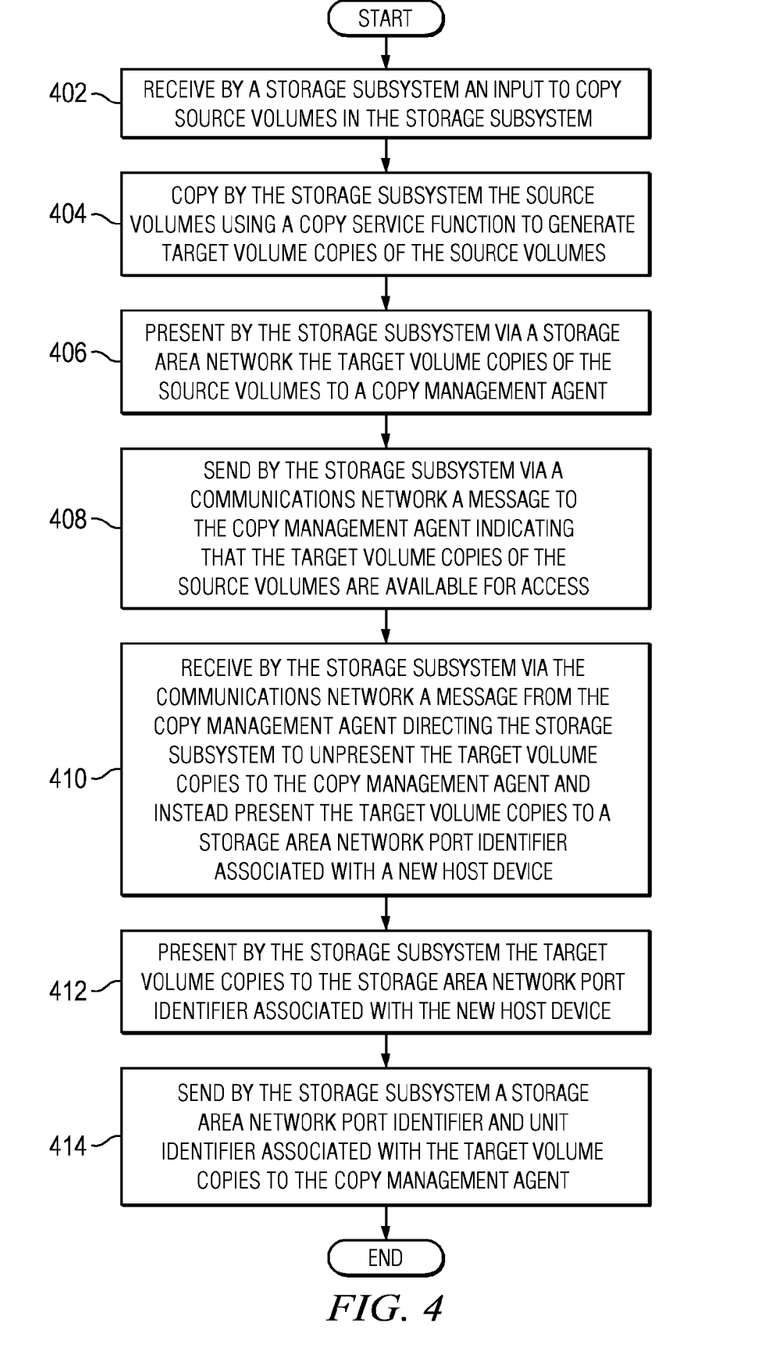
FIG. 4 is a flowchart illustrating a process for a storage subsystem in accordance with an illustrative embodiment.

With reference now to FIG. 4, a flowchart illustrating a process for a storage subsystem is shown in accordance with an illustrative embodiment. The process shown in FIG. 4 may be implemented in a storage subsystem, such as storage subsystem 106 in FIG. 1.

The process begins when the storage subsystem receives an input to copy source volumes, such as source volumes 114 in FIG. 1, in the storage subsystem (step 402). The input may, for example, be a manual input from a user, such as a system administrator, utilizing a local hardware management console or may be an input received via a communications network, such as communications network 102 in FIG. 1, from a customer utilizing a remote client network device. Alternatively, the input may be an automatic input received from a local or remote application executing on a local or remote network device. In response to receiving the input to copy the source volumes in step 402, the storage subsystem copies the source volumes using a copy service function to generate target volume copies of the source volumes, such as target volumes 116 in FIG. 1 (step 404).

Then, the storage subsystem presents via a storage area network the target volume copies of the source volumes to a copy management agent, such as copy management agent 108 in FIG. 1 (step 406). Afterward, the storage subsystem sends via the communications network a message to the copy management agent indicating that the target volume copies of the source volumes are available for access (step 408). Subsequently, the storage subsystem receives via the communications network a message from the copy management agent directing the storage subsystem to un-present the target volume copies to the copy management agent and instead present the target volume copies to a storage area network port identifier associated with a new host device, such as host device 112 in FIG. 1 (step 410).

Then, the storage subsystem presents the target volume copies to the storage area network port identifier associated with the new host device (step 412). In addition, the storage subsystem sends a storage area network port identifier and unit identifier associated with the target volume copies to the copy management agent (step 414). The process terminates thereafter.

Figure 5:
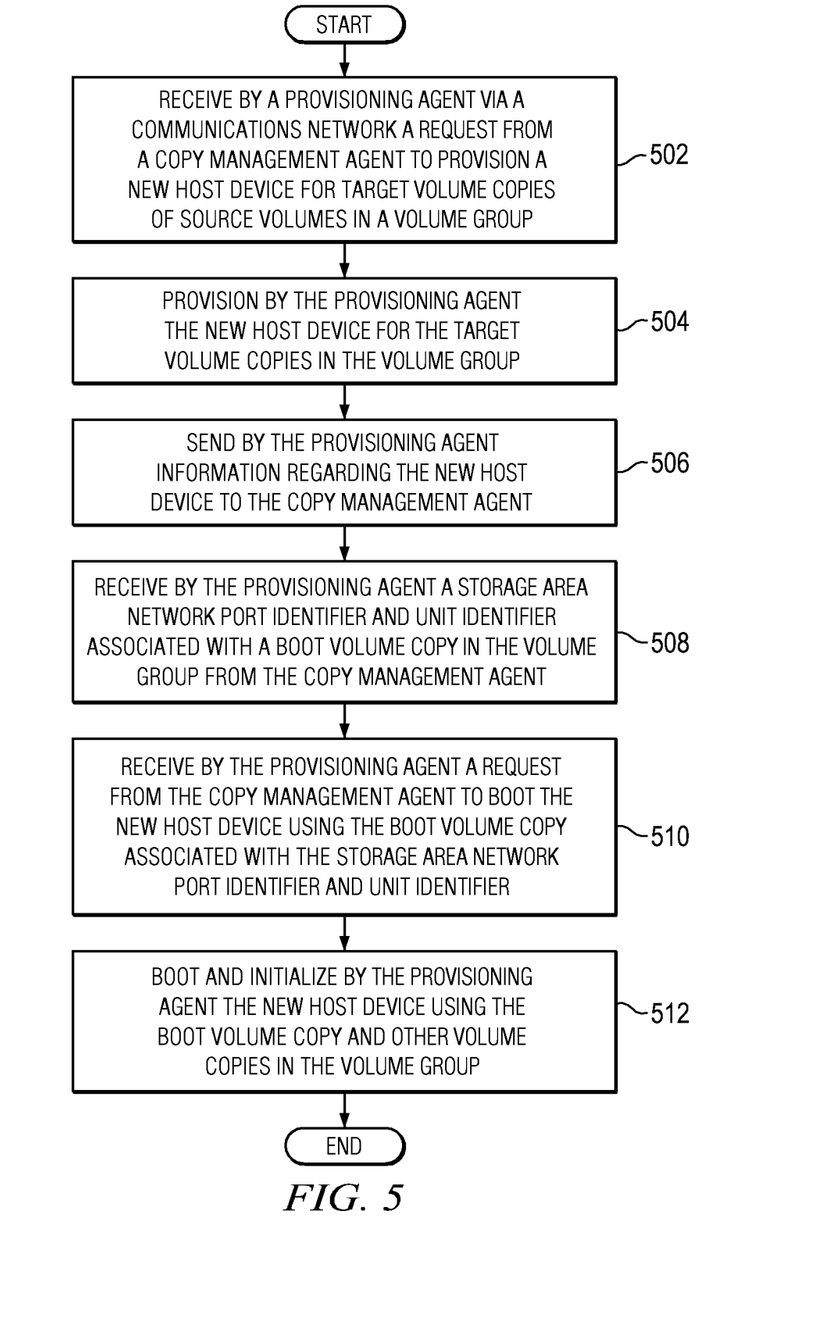
FIG. 5 is a flowchart illustrating a process for a provisioning agent in accordance with an illustrative embodiment.

With reference now to FIG. 5, a flowchart illustrating a process for a provisioning agent is shown in accordance with an illustrative embodiment. The process shown in FIG. 5 may be implemented in a provisioning agent, such as provisioning agent 110 in FIG. 1.

The process begins when the provisioning agent receives via a communications network, such as communications network 102 in FIG. 1, a request from a copy management agent, such as copy management agent 108 in FIG. 1, to provision a new host device, such as host device 112 in FIG. 1, for target volume copies of source volumes in a volume group, such as target volumes 116 in FIG. 1 (step 502). Then, the provisioning agent provisions the new host device for the target volume copies in the volume group (step 504).

Provisioning means to assemble a collection of physical or virtual computer components to run an instance of a computer operating system. For example, the provisioning agent would assemble a collection of components of at least one or more central processing units and system memory, a storage area network adapter, a communications network adapter, and disk storage volumes for new host systems. In addition, the provisioning agent may include other components in the collection, such as, for example, display devices and additional storage area network adapters and communications network adapters for redundancy purposes for the new host systems. In provisioning a physical machine, the provisioning agent does not physically assemble the collection of hardware components, but instead selects a physical machine from a pool of pre-assembled physical machines by assigning the selected physical machine to the target volume copies in the volume group. In provisioning a virtual machine, the provisioning agent may, for example, generate a new logical partition in a logically partitioned machine or generate a new virtual machine, such as a virtual input/output server, with corresponding virtual storage area network and communications network adapters. The disk storage volumes for the newly provisioned host machine are provided via the copy management agent.

After provisioning the new host device for the target volume copies in the volume group in step 504, the provisioning agent sends information regarding the newly provisioned host device to the copy management agent (step 506). For example, the provisioning agent sends a storage area network port identifier for the storage area network adapter, whether physical or virtual, of the new host device to the copy management agent. Later, the copy management agent communicates the storage area network port identifier for the storage area network adapter of the new host device to a storage subsystem, such as storage subsystem 106 in FIG. 1, in order for the storage subsystem to present the disk storage volumes to the newly provisioned host device.

Subsequent to sending the information regarding the newly provisioned host device to the copy management agent in step 506, the provisioning agent receives a storage area network port identifier and unit identifier associated with a boot volume copy in the volume group from the copy management agent (step 508). Afterward, the provisioning agent receives a request from the copy management agent to boot the new host device using the boot volume copy associated with the storage area network port identifier and unit identifier (step 510). Then, the provisioning agent boots and initializes the new host device using the boot volume copy and other volume copies in the volume group (step 512). The process terminates thereafter.

Figure 6:
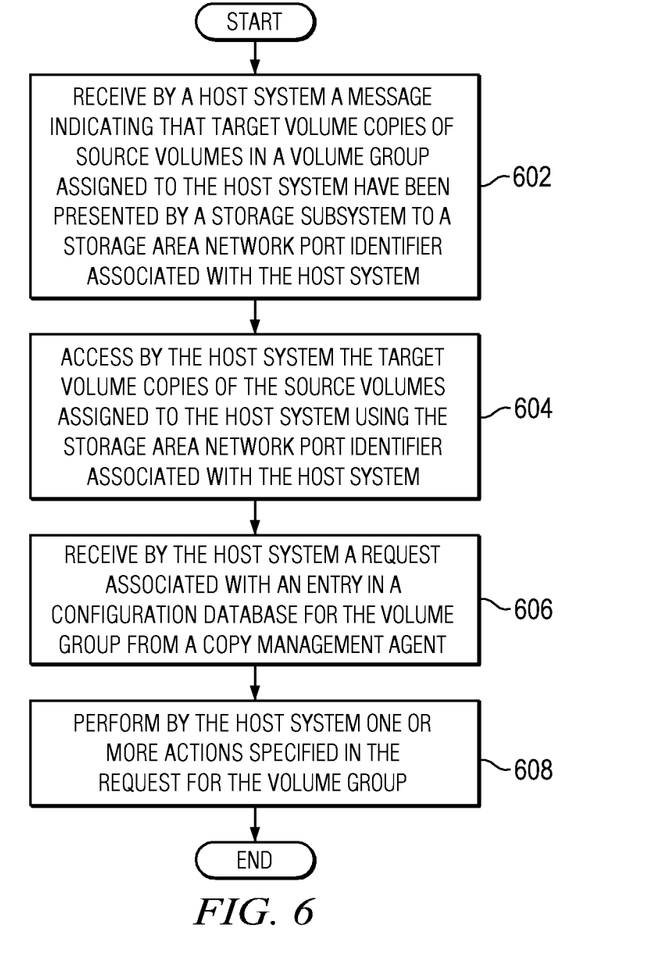
FIG. 6 is a flowchart illustrating a process for a host system in accordance with an illustrative embodiment.

With reference now to FIG. 6, a flowchart illustrating a process for a host system is shown in accordance with an illustrative embodiment. The process shown in FIG. 6 may be implemented in a host system, such as host device 112 in FIG. 1.

The process begins when the host system receives a message indicating that target volume copies of source volumes in a volume group, such as target volumes 116 in FIG. 1, assigned to the host system have been presented by a storage subsystem, such as storage subsystem 106 in FIG. 1, to a storage area network port identifier associated with the host system (step 602). Then, the host system accesses the target volume copies of the source volumes assigned to the host system using the storage area network port identifier associated with the host system (step 604).

In addition, the host system may receive a request associated with an entry in a configuration database, such as configuration database 138 in FIG. 1, for the volume group from a copy management agent, such as copy management agent 108 in FIG. 1 (step 606). Subsequent to receiving the request in step 606, the host system performs one or more actions specified in the request for the volume group (step 608). For example, an action specified in the request may be for the host system to start a formal database instance, such as a DB2® or an Oracle® database instance, using the volume group. Thereafter, the process terminates.

Also, it should be noted that illustrative embodiments install and configure a copy management agent aware storage subsystem with knowledge of the copy management agent's particulars. The particulars may, for example, include the copy management agent's communications network and storage area network identifiers. In addition, if new host systems are to be provisioned by processes of illustrative embodiments, then the copy management agent is configured with the particulars of the provisioning agent. For example, the copy management agent may be configured with the provisioning agent's communications network identifier. Moreover, it should be noted that a customer may via the communications network update the copy management agent's configuration database regarding desired destinations for copied volume groups.

Thus, illustrative embodiments of the present invention provide a data processing system and computer program product for managing data volume copies. The flowchart and block diagrams in the Figures illustrate the architecture, functionality, and operation of possible implementations of data processing systems and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system for automatically managing copies of source data volumes, the data processing system comprising:
 a bus system;
 a storage device connected to the bus system, wherein the storage device stores a set of instructions; and
 a processing unit connected to the bus system, wherein the processing unit executes the set of instructions to receive via a communications network a message from a storage subsystem, wherein the message indicates that target volume copies of source volumes are available for access; access the target volume copies of the source volumes using a storage area network in response to receiving the message from the storage subsystem; analyze metadata for the target volume copies; determine whether any of the target volume copies is a boot volume copy based on the analyzed metadata for the target volume copies; direct via the communications network a provisioning agent to provision a new host for the target volume copies in response to a determination that one of the target volume copies is a boot volume copy; direct via the communications network the storage subsystem to present the target volume copies to a storage area network port associated with the new host provisioned for the target volume copies; and direct the provisioning agent to boot the new host provisioned for the target volume copies using the boot volume copy.

2. The data processing system of claim 1, wherein the processing unit executes a further set of instructions to direct via the communication network the storage subsystem to present the target volume copies to a storage area network port associated with an existing host specified in a configuration database associated with a copy management agent in response to a determination that none of the target volume copies is a boot volume copy.

3. The data processing system of claim 1, wherein the processing unit executes a further set of instructions to generate new unique volume identifiers for all the target volume copies of the source volumes; update volume identifiers of the target volume copies of the source volumes to the new unique volume identifiers; and update the metadata for the target volume copies of the source volumes to include the new unique volume identifiers.

4. The data processing system of claim 2, wherein the processing unit executes a further set of instructions to send any specific request associated with an entry in the configuration database for the target volume copies to the existing host.

5. A computer program product stored on a non-transitory computer readable storage device having computer usable program code embodied thereon that is executable by a computer for automatically managing copies of source data volumes, the computer program product comprising:

computer usable program code for receiving via a communications network a message from a storage subsystem, wherein the message indicates that target volume copies of source volumes are available for access;

computer usable program code for accessing the target volume copies of the source volumes using a storage area network in response to receiving the message from the storage subsystem;

computer usable program code for analyzing metadata for the target volume copies;

computer usable program code for determining whether any of the target volume copies is a boot volume copy based on the analyzed metadata for the target volume copies;

computer usable program code for directing via the communications network a provisioning agent to provision a new host for the target volume copies in response to a determination that one of the target volume copies is a boot volume copy;

computer usable program code for directing via the communications network the storage subsystem to present the target volume copies to a storage area network port associated with the new host provisioned for the target volume copies; and     computer usable program code for directing the provisioning agent to boot the new host provisioned for the target volume copies using the boot volume copy.

6. The computer program product of claim 5 further comprising:

computer usable program code for directing via the communications network the storage subsystem to present the target volume copies to a storage area network port associated with an existing host specified in a configuration database associated with a copy management agent in response to a determination that none of the target volume copies is a boot volume copy.

7. The computer program product of claim 5 further comprising:

computer usable program code for generating new unique volume identifiers for all the target volume copies of the source volumes;

computer usable program code for updating volume identifiers of the target volume copies of the source volumes to the new unique volume identifiers; and     computer usable program code for updating the metadata for the target volume copies of the source volumes to include the new unique volume identifiers.

8. The computer program product of claim 6 further comprising:

computer usable program code for sending any specific request associated with an entry in the configuration database for the target volume copies to the existing host.

9. The computer program product of claim 5 further comprising:

computer usable program code for receiving information from the provisioning agent regarding the new host provisioned for the target volume copies; and     computer usable program code for updating the boot volume copy to include the information sent by the provisioning agent regarding the new host provisioned for the target volume copies.

10. The computer program product of claim 5 further comprising:

computer usable program code for consulting a configuration database associated with a copy management agent to determine whether a destination in an existing host has been assigned to the target volume copies in response to a determination that none of the target volume copies is a boot volume copy; and     computer usable program code for directing via the communications network the storage subsystem to present the target volume copies to a destination storage area network port associated with the existing host specified in the configuration database in to response to a determination that a destination in an existing host has been assigned to the target volume copies.

\* \* \* \* \*